(12) United States Patent
Birdsong

(10) Patent No.: US 6,612,265 B1
(45) Date of Patent: Sep. 2, 2003

(54) SAFETY HARNESS FOR TRANSPORTING AND TRAINING LARGE ANIMALS

(76) Inventor: John P. Birdsong, 400 Lakeview Dr., Longview, TX (US) 75604

( * ) Notice: Subject to any disclaimer, the term of this patent is extended or adjusted under 35 U.S.C. 154(b) by 0 days.

(21) Appl. No.: 10/242,988

(22) Filed: Sep. 13, 2002

(51) Int. Cl.$^7$ ................................................ A01K 27/00
(52) U.S. Cl. ......................... 119/856; 119/712; 119/769
(58) Field of Search ................................. 119/712, 769, 119/792, 856, 863, 771; 54/23

(56) References Cited

U.S. PATENT DOCUMENTS

| 152,276 | A | * | 6/1874 | Clarridge | 119/712 |
|---|---|---|---|---|---|
| 225,715 | A | * | 3/1880 | Middleton | 119/712 |
| 378,153 | A | * | 2/1888 | Tiffany | 119/724 |
| 4,528,944 | A | | 7/1985 | Reed et al. | |
| 4,535,724 | A | * | 8/1985 | David | 119/712 |
| 4,676,198 | A | | 6/1987 | Murray | |
| 4,970,991 | A | | 11/1990 | Luce | |
| 5,167,203 | A | * | 12/1992 | Scott et al. | 119/771 |
| 5,511,515 | A | | 4/1996 | Brown et al. | |
| 5,531,187 | A | | 7/1996 | Ward | |
| 5,755,185 | A | * | 5/1998 | Gallagher | 119/792 |
| 5,937,794 | A | * | 8/1999 | Hediger | 119/856 |

* cited by examiner

Primary Examiner—Charles T. Jordan
Assistant Examiner—Judith Nelson
(74) Attorney, Agent, or Firm—Kenneth A. Roddy

(57) ABSTRACT

A tethering and restraint safety harness for transporting a large equine or bovine animal in their natural upright position in a trailer is disclosed. Adjustable front and rear girt straps encircle the front and rear parts of the animal immediately behind its front legs and just in front of its hind legs and an adjustable body strap extends around the lateral sides, breast and buttocks of the animal. Front and rear pairs of tether straps connect the harness to eye bolts on an overhead support structure of the trailer to maintain the animal in a natural standing position. The harness substantially reduces the likelihood of the animal tripping or falling and from being, tossed around in the trailer and injuring himself in the event of abrupt stops, sudden swerves, or a collision. If for any reason the animal does loose his footing, the weight of the animal will be supported and generally equally distributed to the trailer support structure to maintain the load balanced between the wheels and prevent the weight of the trailer from shifting, thereby reducing the likelihood of overturning and causing injury to the human passengers of the towing vehicle as well. The harness may also be used as a training harness by attaching one end of the tethering straps to the front and rear girt straps and their free ends to a member anchored in the ground adjacent to the lateral sides of the animal to maintain the animal in a stationary position.

12 Claims, 7 Drawing Sheets

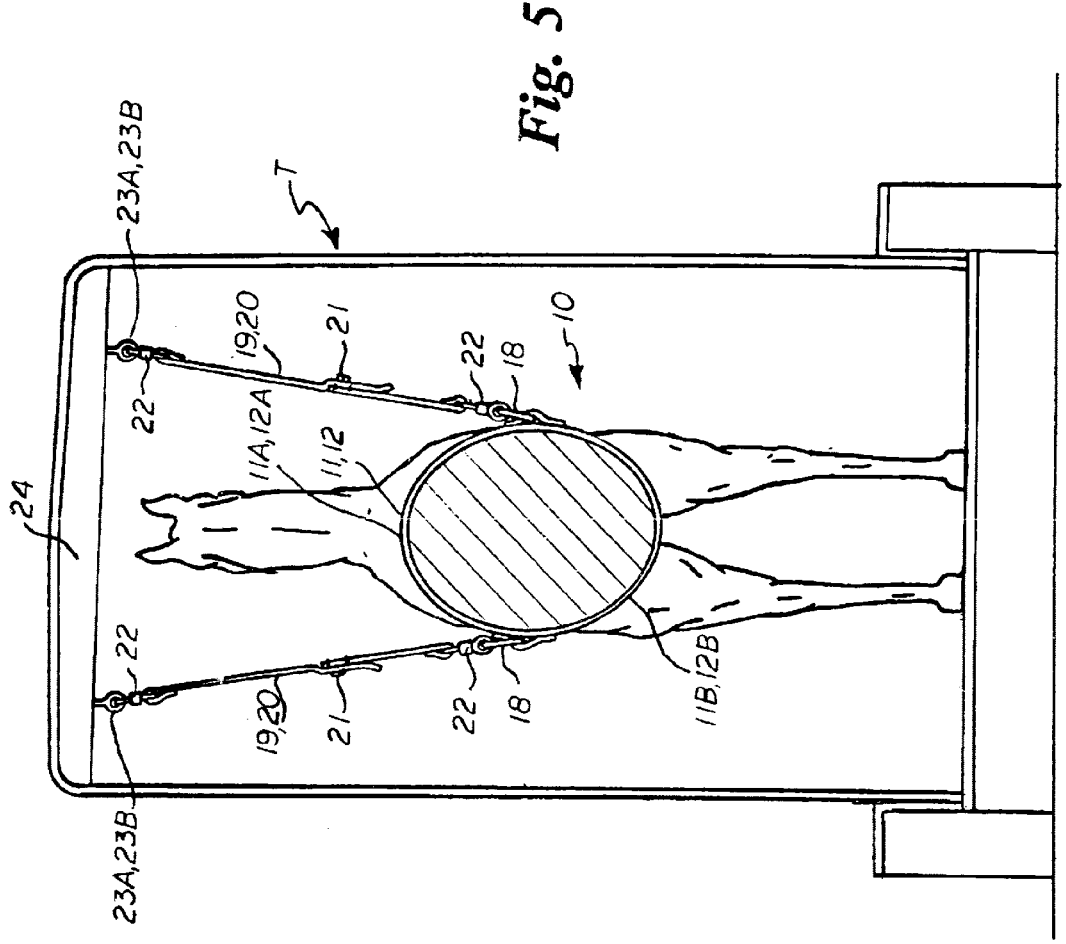

SAFETY HARNESS FOR TRANSPORTING AND TRAINING LARGE ANIMALS

BACKGROUND OF THE INVENTION

1. Field of the Invention

This invention relates to the field of tethering devices, training devices, and safety restraint devices for animals, and more particularly to a tethering and restraint safety harness that holds a large equine or bovine animal in their natural upright position when being transported in a trailer, and may also be used as a training harness to maintain the animal in a stationary position.

2. Brief Description of the Prior Art

Many people that own or raise horses for pleasure riding, parades, racing, polo, breeding, rodeo competition, and competition in horse shows, are very concerned for the care and safety of their animals. Many of these animals will be transported thousands of miles each year in horse trailers. Each year many of these animals are injured or killed during transportation in the trailer when moving from one location to another. Because of the high weight per unit area load, large equine or bovine animals can also suffer muscle and skin damage, as well as cuts and broken bones, as a result of being tossed about or falling down in the trailer during abrupt stops or collisions. When a horse is thrown down in a trailer, it will often kick and break the leg of a horse in an adjacent stall in its attempts to right itself.

When a large equine or bovine animal is transported inside a covered trailer, it is desirable to restrain the animal so as to prevent it from being tossed about in the trailer or falling during abrupt stops, collisions, or sudden swerving movements of the trailer. This will not only prevent injury to the animal itself, but will also protect the human passengers of the towing vehicle from injury, should the weight of the trailer suddenly shift. This weight shift is even more dangerous when several animals are being transported in a single trailer and can easily turn a trailer over.

It is also desirable, on many occasions, to hold an equine or bovine animal in a stationary position. For example, if such an animal is held stationary, a veterinarian could examine and/or administer medications much more easily and reduce the likelihood of injury to both the veterinarian and to the animals.

Another occasion when it is also desirable to hold such an animal in a stationary position is during the training of a young colt. When training a young colt to accept a saddle and then a rider, the colt will buck and often cause injury to themselves or to the trainer or rider. Holding a young colt in a stationary position also will prevent them from turning in circles and simplifies the tasks of saddling the animal, picking up their feet to clean the hooves, brushing their coat, trimming their ears, or using noisy implements close to them such as electric vacuum cleaners and shears.

Various safety harnesses are known, which restrain a small pet in a vehicle in different ways. There have been some attempts to provide restraints of one type or another for use in automotive vehicles to restrain the activity of dogs, cats, and other animals when carried in an automotive vehicle either on a seat or in the rear of pickup trucks. The devices heretofore attempted have normally consisted of leashes with hooks or the like which can be hooked to a portion of the vehicle, particularly to the bed of a pickup truck.

Reed et al, U.S. Pat. No. 4,528,944 discloses an animal (dogs or horses etc) exercising, harness that has a strap encircling the chest of the animal and a pair of elastic straps that extend around a pulley attached to the chest harness to the rear feet of the animal. There is no second harness encircling the hindquarters, nor any provision for supporting or transporting the animal in their natural upright position in a trailer.

Murray, U.S. Pat. No. 4,676,198 discloses a harness for dogs or other animals that has a pair of straps encircling the body of the animal in two places between the front and rear legs and a chest strap with a built-in leash. The harness has a loop that can be used to attach it to a vehicle seat belt or to receive a strap mounted in the bed of a pickup truck. There is no strap extending around the rump of the animal, nor any provision for supporting or transporting the animal in their natural upright position in a trailer.

Luce, U.S. Pat. No. 4,970,991 discloses an animal safety harness that has a pair of straps encircling the neck and chest area of the animal and a chest strap connected therebetween. The harness has a series of loops that can be used to attach it to a vehicle seat belt or to receive a strap mounted in the bed of a pickup truck. There is no strap extending around the rump of the animal, nor any provision for supporting or transporting the animal in their natural upright position in a trailer.

Scott et al, U.S. Pat. No. 5,167,203 discloses a pet safety harness which has a pair of straps encircling the body of the animal in two places between the front and rear legs, a chest strap, and a pair of straps extending rearwardly with buckles which can be attached to a special frame through which a vehicle seat belt passes. There is no strap extending around the rump of the animal, nor any provision for supporting or transporting the animal in their natural upright position in a trailer.

Brown et al, U.S. Pat. No. 5,511,515 discloses an animal training and restraining harness which has a pair of straps encircling the body of the animal in two places between the front and rear legs, a chest strap, and a pair of straps extending forwardly to form loops to encircle the front legs. There is no strap extending around the rump of the animal, no means for attaching the harness to a vehicle, nor any provision for supporting or transporting the animal in their natural upright position in a trailer.

Ward, U.S. Pat. No. 5,531,187 discloses a multi-purpose animal harness which has three straps encircling the body between the front and rear legs and one strap encircling the body forward of the front legs and a leash connected to the top of the harness. There is no strap extending around the rump of the animal, nor any provision for supporting or transporting the animal in their natural upright position in a trailer.

Most of these harnesses are designed to encircle the body of the animal between the front and rear legs, some provide a chest strap, and some provide loops which can be used to attach the harness to a vehicle seat belt or to receive a strap mounted in the bed of a pickup truck. However, none of these would be particularly suitable for tethering, restraining, and transporting a large equine or bovine animal in their natural upright position in a trailer. None of these harness structures would substantially reduce the likelihood of the animal tripping or falling and prevent it from being tossed around in a trailer, and none would be capable of equally distributing the weight of the animal to a trailer support structure to maintain the load balanced between the wheels and prevent the weight of the trailer from shifting.

The present invention is distinguished over the prior art in general, and these patents in particular by a tethering and restraint safety harness for transporting a large equine or bovine animal in their natural upright position in a trailer. The harness has adjustable front and rear girt straps that encircle the front and rear parts of the animal immediately behind its front legs and just in front of its hind legs and an adjustable body strap that extends around the lateral sides, breast and buttocks of the animal. Front and rear pairs of tether straps connect the harness to eye bolts on the overhead support structure of the trailer to maintain the animal in a natural standing position. The harness substantially reduces the likelihood of the animal tripping or falling and from being tossed around in the trailer and injuring himself in the event of abrupt stops, sudden swerves, or a collision. If for any reason the animal does loose his footing, the weight of the animal will be supported and generally equally distributed to the trailer support structure to maintain the load balanced between the wheels and prevent the weight of the trailer from shifting or possibly wrecking, thereby reducing the likelihood of injury to the human passengers of the towing vehicle as well. The harness may also be used as a training harness by attaching one end of the tether straps to the front and rear girt straps and their free ends to a member anchored in the ground adjacent to the lateral sides of the animal to maintain the animal in a stationary position.

SUMMARY OF THE INVENTION

It is therefore an object of the present invention to provide a tethering and restraint safety harness that holds a large equine or bovine animal in their natural upright position when being transported in a trailer.

It is another object of this invention to provide a tethering and restraint safety harness that substantially reduces the likelihood of a large equine or bovine animal tripping or falling down when being transported in a trailer.

Another object of this invention is to provide a tethering and restraint safety harness that substantially reduces the likelihood of a large equine or bovine animal being tossed about in the trailer or falling during abrupt stops, collisions, or sudden swerving movements of the trailer.

Another object of this invention is to provide a tethering and restraint safety harness that will support the weight of a large equine or bovine animal from the structure of the trailer in which it is being transported and equally distribute and maintain the load balanced between the trailer wheels to prevent the weight of the trailer from shifting in the event that the animal looses its footing, thereby reducing the likelihood of injury to the human passengers of the towing vehicle, which might otherwise occur should the weight of the trailer suddenly shift or overturn.

Another object of this invention is to provide a tethering and restraint safety harness having front and rear girt straps that encircle the front and rear parts of a large equine or bovine animal immediately behind its front legs and just in front of its hind legs and a body strap that extends around the lateral sides, breast and buttocks of the animal which can be easily and quickly positioned on the animal, adjusted and tightened by a single user standing on only one side of the animal.

A further object of this invention is to provide a tethering and restraint safety harness having front and rear girt straps that encircle the front and rear parts of an equine animal and a body strap that extends around the lateral sides, breast and buttocks of the animal, which may be used as a training harness by attaching one end of tether straps to the front and rear girt straps and their free ends to a member anchored in the ground adjacent to the lateral sides of the animal to maintain the animal in a stationary position.

A still further object of this invention is to provide a tethering and restraint safety harness for transporting large equine or bovine animal in a trailer which is simple in construction, inexpensive to manufacture, easy to use, and rugged and reliable in use.

Other objects of the invention will become apparent from time to time throughout the specification and claims as hereinafter related.

The above noted objects and other objects of the invention are accomplished by a tethering and restraint safety harness for transporting a large equine or bovine animal in their natural upright position in a trailer. The harness has adjustable front and rear girt straps that encircle the front and rear parts of the animal immediately behind its front legs and just in front of its hind legs and an adjustable body strap that extends around the lateral sides, breast and buttocks of the animal. Front and rear pairs of tether straps connect the harness to eye bolts on the overhead support structure of the trailer to maintain the animal in a natural standing position. The harness substantially reduces the likelihood of the animal tripping or falling and from being tossed around in the trailer and injuring himself, or an adjacent animal, in the event of abrupt stops, sudden swerves, or a collision. If for any reason the animal does loose his footing, the weight of the animal will be supported and generally equally distributed to the trailer support structure to maintain the load balanced between the wheels and prevent the weight of the trailer from shifting, thereby reducing the likelihood of injury to the human passengers of the towing vehicle as well. The harness may also be used as a training harness by attaching one end of the tether straps to the front and rear girt straps and their free ends to a member anchored in the ground adjacent to the lateral sides of the animal to maintain the animal in a stationary position.

BRIEF DESCRIPTION OF THE DRAWINGS

FIG. 5 is an end view of the tethering and restraint safety harness shown with the tether straps connected to an overhead support structure of a trailer to maintain the animal in a natural standing position while being transported, with the body of the animal shown in cross section.

DESCRIPTION OF THE PREFERRED EMBODIMENT

Figure 1:
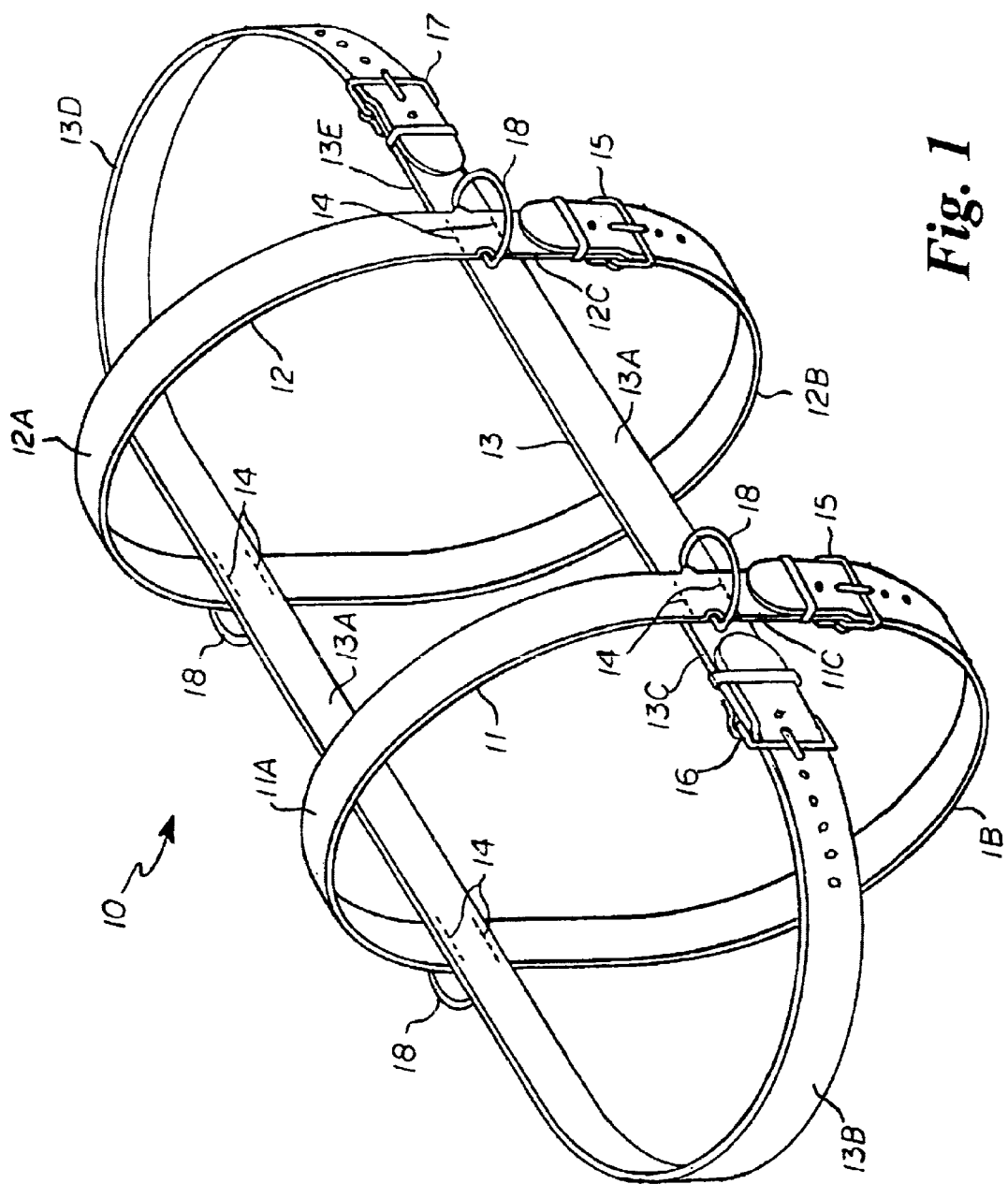
FIG. 1 is a perspective view of the tethering and restraint safety harness in accordance with the present invention.
Figure 2:
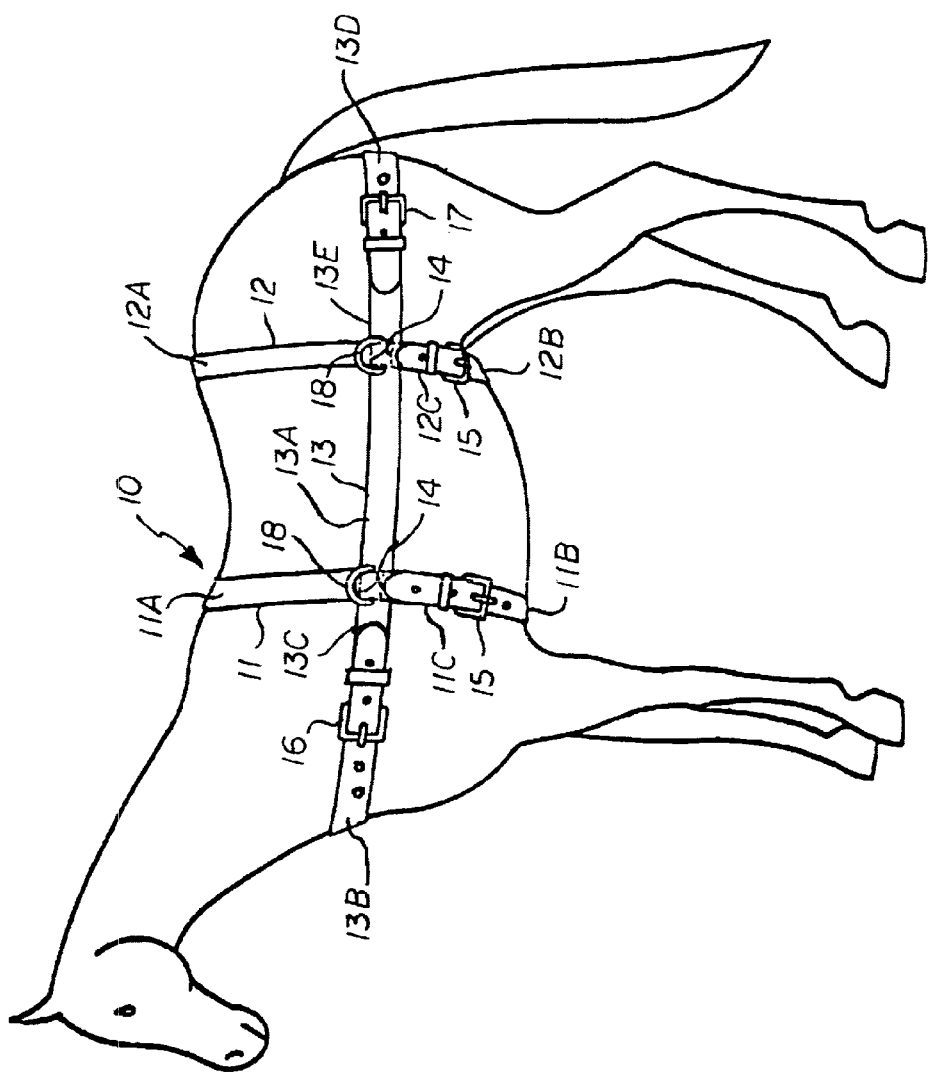
FIGS. 2 and 3 are left and right side elevations, respectively, of the tethering and restraint safety harness, shown positioned on an animal.
Figure 3:
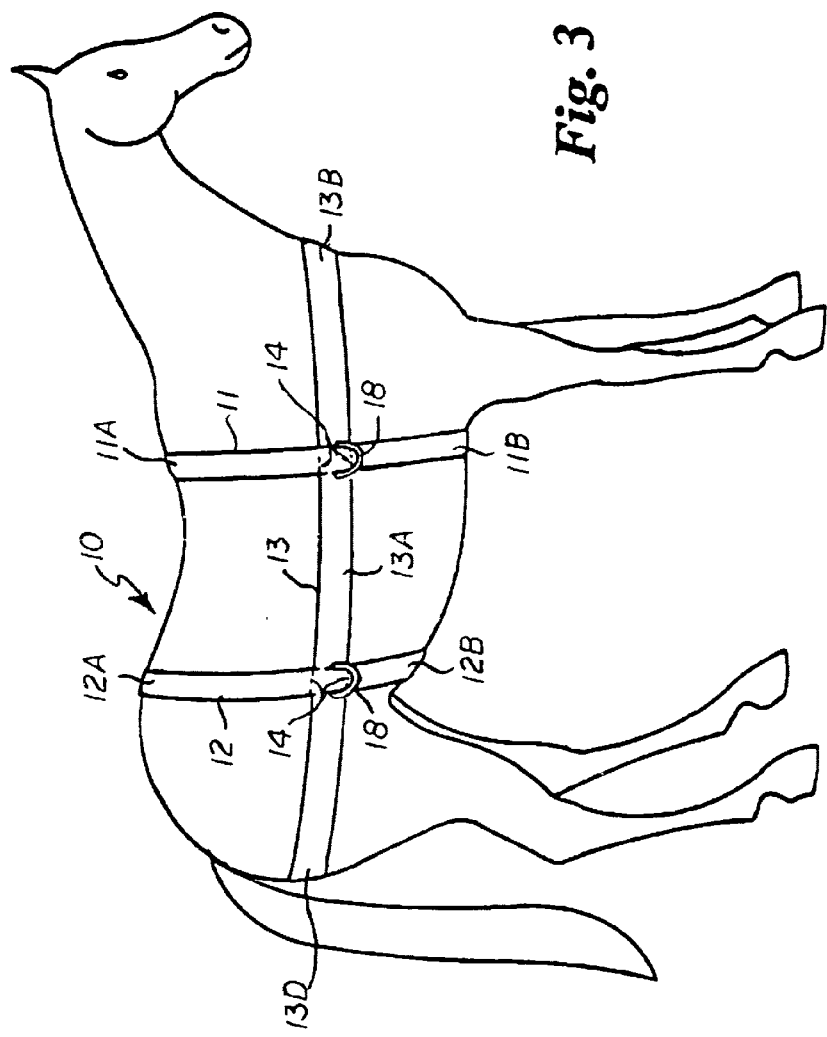

For purposes of illustration and example, the harness is shown positioned on a horse, however it should be understood that it may be used with other large animals such as bovines (show cattle, bulls, breeding stock, etc.). Referring to the drawings by numerals of reference, there is shown in FIGS. 1, 2 and 3, a preferred embodiment of the tethering and restraint safety harness, generally referred to by reference numeral 10. The harness 10 has a flexible front girt strap 11 that encircles the front part of the animal immediately behind its front legs, and a flexible rear girt strap 12 that encircles the rear part of the animal in front of its hind legs. The front and rear girt straps 11 and 12 are interconnected by a body strap 13 that encircles the lateral sides, breast and buttocks of the animal in a generally horizontal plane. All straps are made of leather, nylon webbing, or other suitable durable flexible material.

In a preferred embodiment, the front girt strap 11 and the rear girt strap 12 are each interconnected on opposed lateral sides with the body strap 13 by stitching 14, riveting or joined together by a ring at their intersection with the body strap.

The front girt strap 11 and the rear girt strap 12 each have a top segment 11A and 12A, respectively above their interconnection with the body strap 13 that extends over the animal's back. The front girt strap 11 and the rear girt strap 12 each have a longer bottom segment 11B and 12B, respectively, that extends below their interconnection with the body strap 13 on one side that is provided with apertures and a shorter side segment 11C and 12C that extends below their interconnection with the body strap 13 on the opposed side that is provided with a buckle 15. The longer (11B, 12B) and shorter segments (11C, 12C) are releasably connected to each other by the buckles 15 to provide for adjusting the length and tightening front and rear girt straps to fit around the animal.

The body strap 13 has opposed lateral side segments 13A between its interconnection with the front girt strap 11 and the rear girt strap 12 that extend along the sides of the animal. The body strap 13 has a longer front segment 13B that extends forwardly from its interconnection with the front girt strap 11 on one side that is provided with apertures and a shorter front segment 13C that extends forwardly from its interconnection with the front girt strap 11 on the opposed side that is provided with a buckle 16. The longer (13B) and shorter front segments (13C) are releasably connected to each other by the buckle 16 to provide for adjusting the length and tightening front segments 13B and 13C to fit around the front or breast of the animal.

The body strap 13 has a longer rear segment 13D that extends rearwardly from its interconnection with the rear girt strap 12 on one side that is provided with apertures and a shorter rear segment 13E that extends rearwardly from its interconnection with the rear girt strap 12 on the opposed side that is provided with a buckle 17. The longer (13D) and shorter rear segments (13E) are releasably connected to each other by the buckle 17 to provide for adjusting the length and tightening rear segments 13D and 13E to fit around the rear or buttocks to the animal.

Thus it should be understood from the foregoing, that the front and rear girt straps 11 and 12 can be adjustably tightened around the front and rear parts of the animal immediately behind its front legs and just in front of its hind legs, and the body strap 13 can be adjustably tightened around the lateral sides, breast and buttocks of the animal so as to accommodate animals of different size. Placing the buckles 15, 16 and 17 on the shorter segments of the straps, allows the user to adjust and tighten the front and rear girt straps 11 and 12 and the body strap 13 while standing on only one side of the animal. A D-ring 18 is secured to each lateral side of the front girt strap 11 and on each lateral side of the rear girt strap 12, respectively, at or near their interconnection with the body strap 13.

Figure 4:
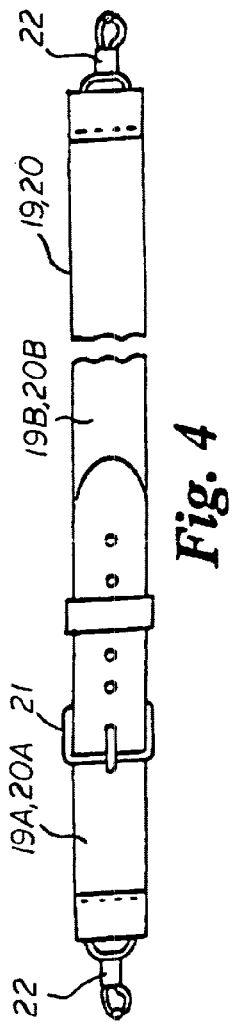
FIG. 4 is plan view of an adjustable tether strap of the tethering and restraint safety harness.

A pair of front tether straps 19 and a pair of rear tether straps 20, as shown in FIG. 4 are provided for attachment to the harness 10. Each of the front and rear tether straps 19, 20 may be provided as unitary straps of various length, or may be segmented to allow adjustability. In a preferred embodiment, as best seen in FIG. 4, each of the front and rear tether straps 19 and 20 have a first segment 19A, 20A with apertures at one end and a second segment 19B, 20B having, a buckle 21 at one end that are adjustably connected together to provide for adjusting their lengths. Each free end of the front and rear tether straps 19 and 20 are provided with a heavy-duty quick-release snap hook 22 with a swivel connector, or other suitable quick release connecter. The snap hooks 22 at one end of the front tether straps 19 are releasably connected to the D-rings 18 on each lateral side of the front girt strap 11, and the snap hooks 22 at one end of the rear tether straps 20 are releasably connected to the D-rings 18 on each lateral side of the rear girt strap 12, respectively. The snap hooks 22 allow the straps 19 and 20 to be connected easily and quickly.

Figure 5A:
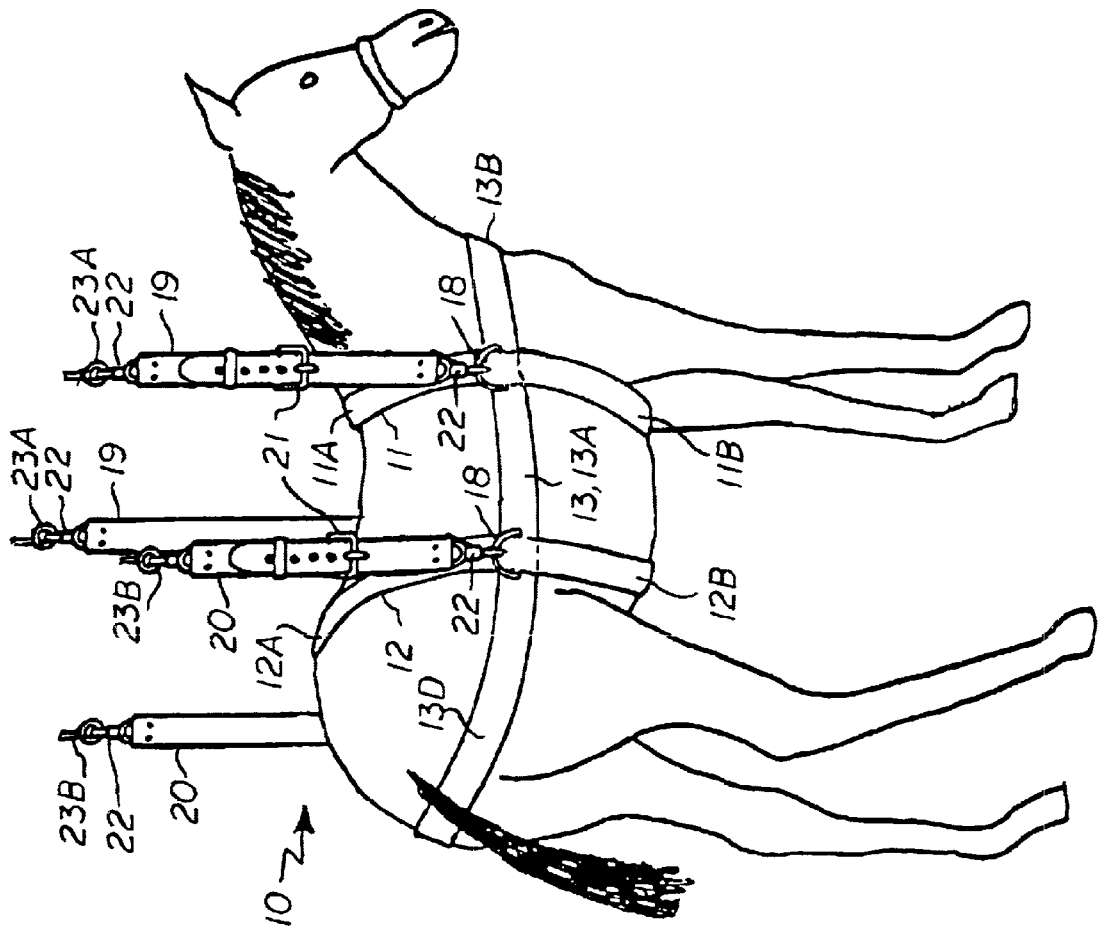
FIG. 5A is a perspective view of the harness arrangement in the transport mode depicted in FIG. 5.

As shown somewhat schematically in FIGS. 5 and 5A, a front pair of laterally spaced eye bolts 23A and a rear pair of laterally spaced eye bolts 23B are secured to an overhead structural member 24 of a covered trailer T. The front and rear pairs of eye bolts 23A and 23B are spaced longitudinally to approximately correspond to the longitudinal spacing between the front and rear girt straps 11 and 12.

The snap hooks 22 at the other end of the front tether straps 19 are releasably connected to a respective one of the front pair of eye bolts 23A and the snap hooks 22 at the other end of the rear tether straps 20 are releasably connected to a respective one of the rear eye bolts 23B. respectively.

When the front and rear tether straps 19 and 20 are connected between the eye bolts 23A and 23B and the D-rings 18, and adjusted in length with the animal in a natural standing position, they extend generally vertically upward from the harness in laterally opposed and longitudinally spaced relation. Each of the front and rear tether straps 19 and 20 should be tightened by adjusting the buckles 21 such that they are relatively taught but with sufficient slack to allow the animal to shift it's weight for comfort when the animal is in its natural standing position.

When the harness 10 is cinched on the animal and the front and rear tether straps 19 and 20 are connected to the eye bolts 23A, 23B, the animal can be safely supported and transported inside the trailer in their natural upright standing position. The present invention substantially reduces the likelihood of the animal tripping or falling and from being tossed around in the trailer, further injuring himself, as he might otherwise do should the trailer come to an abrupt stop, suddenly swerves, or is involved in a collision. If for any reason the animal does loose his footing, the weight of the animal will be supported and generally equally distributed to the overhead trailer support structure by the laterally and longitudinally spaced overhead tether straps and eye bolts, thereby maintaining the load balanced between the trailer wheels and preventing the weight of the trailer from shifting forward, backward, or from side to side, thereby reducing the likelihood of injury to the human passengers of the towing vehicle, which might otherwise occur should the weight of the trailer suddenly shift.

Figure 6:
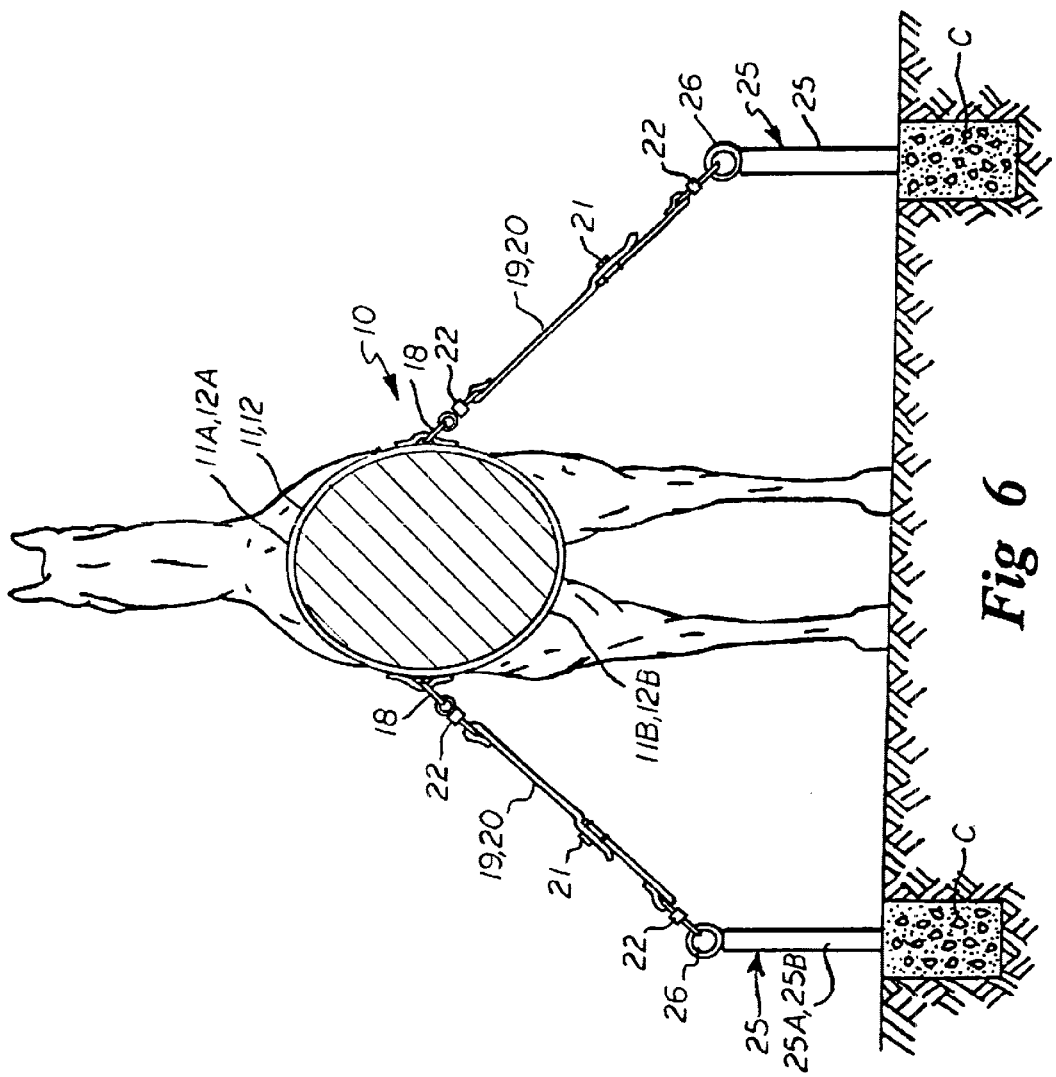
FIG. 6 is an end view of the tethering and restraint safety harness shown with the tether straps connected to lateral support structures anchored to the ground to maintain the animal in a stationary position while being saddled, trained, groomed, etc., with the body of the animal shown in cross section.
Figure 6A:
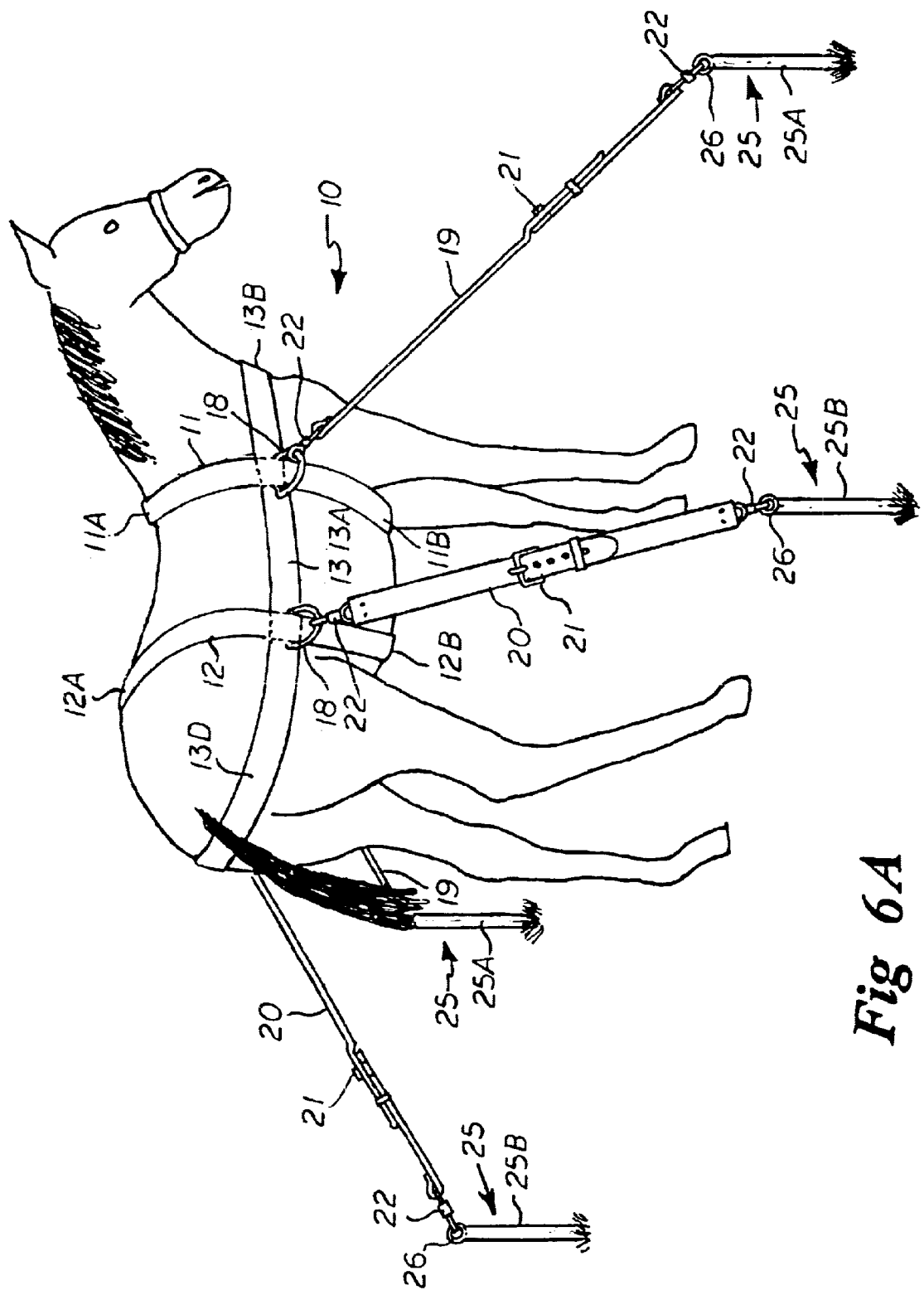
FIG. 6A is a perspective view of the harness arrangement in the training mode depicted in FIG. 6.

Referring now to FIGS. 6 and 6A, the front and rear tether straps 19 and 20 may also be used to tether the animal to a structure 25 anchored in the ground to maintain the animal in a stationary position. In this application, the hook snaps 22 at one end of the front tether straps 19 and rear tether straps 20 are releasably connected to the D-rings 18 on the front girt strap 11 and rear girt strap 12, respectively, and the snap hooks 22 at their outer ends are releasably connected to the structure 25 anchored in the ground a distance outward from the lateral sides of the animal to maintain the animal in a stationary position. In the example illustrated somewhat schematically in FIGS. 6 and 6A, the structures 25 anchored in the ground are a front pair of laterally spaced posts 25A and a rear pair of laterally spaced posts 25B, each having one end anchored in the ground by concrete C, with a ring 26 secured to its upper end that receives the snap hooks 22 at the free end of the tether straps 19 and 20. The front and rear pairs of posts 25A and 25B are spaced longitudinally to approximately correspond to the longitudinal spacing between front and rear girt straps 11 and 12, and are disposed a distance outwardly therefrom.

By maintaining the animal in a stationary position, a veterinarian can examine and/or administer medications easily with reduced likelihood of injury to either the veterinarian or to the animal. Maintaining the animal in a stationary position also facilitates the training of the animal and reduces the likelihood of injury to both the trainer and the animal. For example, when training a young colt to accept a saddle and then a rider, the colt will buck and often cause injury to themselves or to the trainer or rider. Holding a young colt in a stationary position also will prevent them from turning in circles while being saddled and simplifies the task of picking LIP their feet to clean the hooves, brush their coat, trim their ears, or use noisy implements close to them such as electric vacuum cleaners and shears.

While this invention has been described fully and completely with special emphasis upon preferred embodiments, it should be understood that within the scope of the appended claims the invention may be practiced otherwise than as specifically described herein.

What is claimed is:

1. A safety restraint harness for transporting and training large animals, comprising:
    a flexible front girt strap that encircles a front part of the animal immediately behind its front legs;
    a flexible rear girt strap that encircles a rear part of the animal in front of its hind legs;
    an elongate flexible body strap, interconnected with opposed lateral sides of said front and rear girt straps, that encircles the lateral sides, breast and buttocks of the animal in a generally horizontal plane; and
    a pair of flexible front tether straps each having a first end releasably connected with a respective opposed lateral side of said front girt strap, and a pair of flexible rear tether straps each having a first end releasably connected with a respective opposed lateral side of said rear girt strap;
    each of said front and rear tether straps having a second end adapted to be releasably connected with a structural member spaced a distance from the animal to restrain and immobilize the animal.

2. The safety restraint harness according to claim 1, further comprising:
    a first pair of ring members each secured to a respective opposed lateral side of said front girt strap, and a second pair of ring members each secured to a respective opposed lateral side of said rear girt strap;
    said front tether straps each having a first end releasably connected with a respective ring member on opposed lateral sides of said front girt strap, and said rear tether straps each having a first end releasably connected with a respective ring member on opposed lateral sides of said rear girt strap.

3. The safety restraint harness according to claim 1, wherein
    said front girt strap and said rear girt strap each have a top segment above its interconnection with said body strap that extends over the animal's back, a bottom segment greater in length than said top segment that extends below its interconnection with said body strap on one lateral side with a free end provided with apertures, and a side segment shorter in length than said bottom segment that extends below its interconnection with said body strap on the opposed side with a free provided with a buckle; whereby
    said bottom segment and said side segment is releasably connected together and adjusted in length to fit tightly around the animal's body by a person standing only on one side of the animal.

4. The safety restraint harness according to claim 3, wherein
    said body strap has a longer front segment that extends forwardly from its interconnection with said front girt strap on one lateral side with a free end provided with apertures, and a shorter front segment that extends forwardly from its interconnection with said front girt strap on the opposed lateral side with a free end provided with a buckle; and
    said body strap has a longer rear segment that extends rearwardly from its interconnection with said rear girt strap on said one lateral side with a free end provided with apertures, and a shorter rear segment that extends rearwardly from its interconnection with said rear girt strap on said opposed lateral side with a free end provided with a buckle; whereby
    said longer and said shorter front and rear segments of said body strap are releasably connected together and adjusted in length to tightly encircle the lateral sides, breast and buttocks of the animal in a generally horizontal plane by a person standing only on one side of the animal.

5. The safety restraint harness according to claim 1, wherein
    each of said front and said rear tether straps have a first segment and second segment connected together by a buckle for adjusting their lengths; and
    said front and said rear tether straps each have a quick-release connector on their said first end for releasably connection to a respective ring member on opposed lateral sides to said front and rear girt straps, and a quick-release connector on their said second end for releasably connection to the structural member.

6. The safety restraint harness according to claim 5, wherein
    said quick-release connector comprises a quick-release snap hook with a swivel connector.

7. The safety restraint harness according to claim 1, further comprising;
    a front pair and a rear pair of eyebolts adapted to be secured to an overhead structural member in an animal trailer;
    each of said front pair and said rear pair of eyebolts being secured in laterally spaced relation, and said front and said rear pair secured in longitudinally spaced relation to approximately correspond to the longitudinal distance between said front and rear girt straps;

said first and second ends of said front tether straps are releasably connected between opposed lateral sides of said front girt strap and said front pair of eyebolts, and said first and second ends of said rear tether straps are releasably connected between opposed lateral sides of said rear girt strap and said rear pair of eyebolts to extend generally vertically in laterally opposed and longitudinally spaced relation; and said front and rear tether straps are adjusted in length to be generally taught with the animal in a natural standing position to maintain the animal in a standing position while being transported in the trailer, such that in the event that the animal looses its footing, the weight of the animal will be supported and generally equally distributed to the overhead trailer support structure by said laterally and longitudinally spaced tether straps and said eye bolts, thereby maintaining the load balanced between the wheels and preventing the weight of the trailer from shifting forward, backward, or from side to side.

8. The safety restraint harness according to claim 1, further comprising;

a front pair and a rear pair of posts each adapted to be secured into the ground at one end and having connector means on an upstanding end;

each of said front pair and said rear pair of posts being anchored in laterally spaced relation, and said front and said rear pair anchored in longitudinally spaced relation a distance outwardly from said front and rear girt straps, respectively;

said first and second ends of said front tether straps are releasably connected between opposed lateral sides of said front girt strap and said connector means on said front pair of posts, and said first and second ends of said rear tether straps are releasably connected between opposed lateral sides of said rear girt strap and said connector means on said rear pair of posts; and said front and rear tether straps are adjusted in length to be generally taught with the animal in a natural standing position to maintain the animal in a generally stationary position and substantially reduce fore, aft, side to side, and bucking movements.

9. A method for transporting and training large animals utilizing a safety restraint harness, comprising the steps of:

providing a harness having an adjustable flexible front girt strap, an adjustable flexible rear girt strap, and an elongate adjustable flexible body strap interconnected with opposed lateral sides of said front and rear girt straps;

placing the harness on the animal such that said front girt strap encircles a front part of the animal immediately behind its front legs, said rear girt strap encircles a rear part of the animal in front of its hind legs, and said body strap encircles the lateral sides, breast and buttocks of the animal in a generally horizontal plane;

adjusting said front and rear girt straps and said body strap in length to fit tightly around the animal's body;

attaching a respective first end of a pair of adjustable flexible front tether straps to a respective opposed lateral side of said front girt strap, and a respective first end of a pair of adjustable flexible rear tether straps to a respective opposed lateral side of said rear girt strap;

connecting a respective second end of each of said front and rear tether straps to a structural member spaced a distance from the animal; and adjusting each of said front and rear tether straps in length to restrain and immobilize the animal.

10. The method according to claim 9, wherein said step of adjusting said front and rear girt straps and said body strap in length is carried out by the installer standing only on one side of the animal.

11. The method according to claim 9, wherein said step of connecting a respective second end of each of said front and rear tether straps to a structural member comprises;

connecting said respective second end of each of said front tether straps to a front pair of laterally spaced eyebolts secured to an overhead structural member in an animal trailer, and connecting said respective second end of each of said rear tether straps to a rear pair of laterally spaced eyebolts secured to an overhead structural member in the animal trailer, said front pair and said rear pair of eyebolts being disposed longitudinally spaced relation to approximately correspond to the longitudinal distance between said front and rear girt straps; and each of said tether straps are adjusted in length with the animal in a natural standing position in the trailer to extend taught generally vertically between opposed lateral sides of said front girt strap and said rear girt strap and said eyebolts in laterally opposed and longitudinally spaced relation; such that in the event that the animal looses its footing, the weight of the animal will be supported and generally equally distributed to the overhead trailer support structure by said laterally and longitudinally spaced tether straps and said eye bolts, thereby maintaining the load balanced between the wheels and preventing the weight of the trailer from shifting forward, backward, or from side to side.

12. The method according to claim 9, wherein said step of connecting a respective second end of each of said front and rear tether straps to a structural member comprises;

connecting said respective second end of each of said front tether straps to a front pair of posts anchored in the ground a distance outwardly from lateral sides of the animal, and connecting said respective second end of each of said rear tether straps to a rear pair of posts anchored in the ground a distance outwardly from lateral sides of the animal, said front pair and said rear pair of posts being disposed in longitudinally spaced relation; and each of said tether straps are adjusted in length with the animal in a natural standing position to extend taught between opposed lateral sides of said front girt strap and said rear girt strap and said posts to maintain the animal in a generally stationary position and substantially reduce fore, aft, side to side, and bucking movements while being saddled, mounted, doctored, groomed, vacuumed, shod, or having its hooves trimmed.

* * * * *